E. T. Jenkins,
Fruit Can.
N° 76,772. 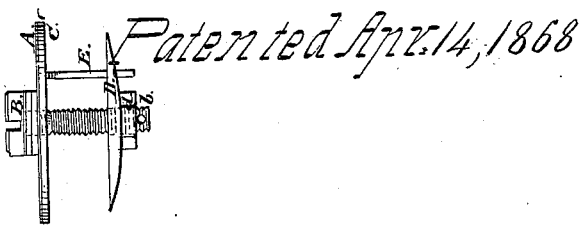 Patented Apr. 14, 1868
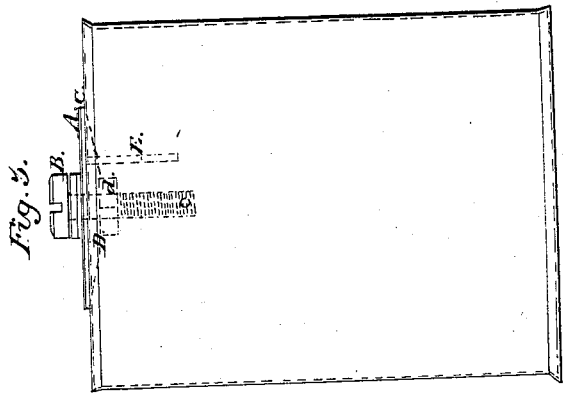
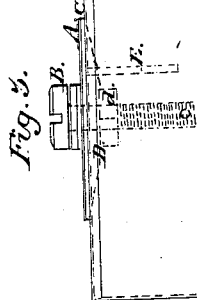
WITNESSES:
F. C. Degener
J. Pouge
INVENTOR:
Edward T. Jenkins
by Alduey Downs.
attorney.

United States Patent Office.

EDWARD T. JENKINS, OF RAVENSWOOD, NEW YORK.

Letters Patent No. 76,772, dated April 14, 1868; antedated April 7, 1868.

IMPROVED DEVICE FOR CLOSING THE MOUTHS OF JARS, CANS, &c.

The Schedule referred to in these Letters Patent and making part of the same.

TO ALL WHOM IT MAY CONCERN:

Be it known that I, EDWARD T. JENKINS, of Ravenswood, Queens county, New York, have invented, made, and applied to use, a new and useful Device for Closing Apertures; and I do declare the following to be a full, clear, and correct description of the same, reference being had to the accompanying drawings, making part of this specification, and to the letters of reference marked thereon, in which—

Figure 1 is a view of my device for closing apertures.

Figure 2 is a bottom view of the same.

Figure 3 is a view of the same as applied to a can for preserving fruit.

In the drawings, like parts of the invention are pointed out by the same letters of reference.

The nature of my invention consists in the construction and operation, as more fully hereinafter described, of a new and useful device for closing apertures, applicable to the closing of cans for the preservation of meats, fruits, and vegetables, to the closing of kegs and barrels, and to other purposes.

To enable those skilled in the arts to make and use my invention, I will describe its construction and operation.

A shows a plate of metal provided with a central opening, through which is inserted a screw, B.

Beneath this plate of metal is placed a washer, C, of rubber, leather, or any suitable material, through which also passes the screw B.

D shows a second plate of metal, made oblong or oval, and smaller than the plate A, and having upon its under side a nut, $d$. Through this plate D the screw B passes, and has inserted at its bottom end a pin, $b$, which bears against the bottom side of the nut $d$, and serves to hold the plate D upon the screw B.

E is a pin attached to the plate A, and made of sufficient length to extend through the plate D, when the plate A is removed as far from the plate D as the turning of the screw will allow.

My device being thus constructed, its operation is as follows: The lower plate of metal D is inserted within the opening to be closed, by turning the device so as to bring it lengthwise across the opening to be closed, inserting one end of the plate D within the opening, and carrying it laterally after such insertion, so as to admit the opposite end, then turning the device so as to bring it directly over the opening, and tightening the screw B by means of a screw-driver or any proper tool.

As the screw is tightened, the same operating upon the nut $d$, causes the plate D to approach the plate A and washer C, and firmly fastens the same, the plate D, when the screw B is fully tightened, bearing upon the under side of the metal or wood surrounding the opening, and the washer C and plate A, upon the upper side of the metal or wood, surrounding the opening, and thus effectually closing the opening in the can, keg, barrel, or other article.

The pin E, passing through the plate D, prevents the same turning when the screw B is turned.

When desired to remove the device, the screw is unfastened to its full extent, the device is turned as when desired to insert it, and the lower plate may be lifted out of the opening or aperture by moving the device laterally, and liberating one end of the plate D, when the rest of the plate will readily follow.

As previously stated, my device will be found particularly applicable to the closing of cans for the preservation of fruits, vegetables, and meats.

Having thus described my invention, what I claim as new, and desire to secure by Letters Patent, is—

I claim the combination of the plates A and D, screw B, washer C, and pin E, for the purposes specified.

EDWARD T. JENKINS.

Witnesses:
   A. SIDNEY DOANE,
   J. POUGE.